US 8,275,027 B2

(12) United States Patent
Abbasfar et al.

(10) Patent No.: US 8,275,027 B2
(45) Date of Patent: Sep. 25, 2012

(54) MULTI-MODE TRANSMITTER

(75) Inventors: Aliazam Abbasfar, Mountain View, CA (US); Amir Amirkhany, Stanford, CA (US)

(73) Assignees: The Board of Trustees of the Leland Stanford Junior University, Palo Alto, CA (US); Rambus Inc., Sunnyvale, CA (US)

( * ) Notice: Subject to any disclaimer, the term of this patent is extended or adjusted under 35 U.S.C. 154(b) by 1036 days.

(21) Appl. No.: 12/117,680

(22) Filed: May 8, 2008

(65) Prior Publication Data

US 2008/0310491 A1 Dec. 18, 2008

Related U.S. Application Data

(60) Provisional application No. 60/943,537, filed on Jun. 12, 2007, provisional application No. 61/021,626, filed on Jan. 16, 2008.

(51) Int. Cl.
*H04L 27/01* (2006.01)

(52) U.S. Cl. ........................................ 375/230; 375/295

(58) Field of Classification Search .................. 375/230, 375/295
See application file for complete search history.

(56) References Cited

U.S. PATENT DOCUMENTS

| | | | |
|---|---|---|---|
| 6,542,976 B2 | 4/2003 | Hampel et al. ................ | 711/167 |
| 6,856,178 B1 * | 2/2005 | Narayan ........................ | 327/108 |
| 7,127,003 B2 | 10/2006 | Rajan ............................ | 375/286 |
| 2003/0058952 A1 * | 3/2003 | Webster et al. ............... | 375/260 |
| 2004/0263246 A1 * | 12/2004 | Robinson et al. ......... | 330/124 R |
| 2006/0018344 A1 | 1/2006 | Pamarti ......................... | 370/480 |
| 2006/0133523 A1 | 6/2006 | Stojanovic et al. ........... | 375/260 |
| 2006/0133538 A1 | 6/2006 | Stojanovic et al. ........... | 375/308 |
| 2007/0026837 A1 * | 2/2007 | Bagchi ........................... | 455/333 |

OTHER PUBLICATIONS

Amirkhany, et al. "Analog Multi-Tone Signaling for High-Speed Backplane Electrical Links", published in the IEEE Globecom2006 proceedings. XP007904713. pp. 1-6.
Amirkhany et al., "Multi-Tone Signaling for High-Speed Backplane Electrical Links", vol. 2, published IEEE Communications Society, Nov. 29, 2004, pp. 1111-1117.
Stojanovic et al., "Optimal Linear Precoding with Theoretical and Practical Data Rates in High-Speed Serial-Link Backplane Communication", published in vol. 5, Jun. 20, 2004 pp. 2799-2806.
Amirkhany et al., "A 24Gb/s Software Programmable Multi-Channel Transmitter", published in VLSI Circuits, 2007 IEEE Symposium on Jun. 1, 2007, pp. 38-39.

* cited by examiner

*Primary Examiner* — Shuwang Liu
*Assistant Examiner* — Michael Neff
(74) *Attorney, Agent, or Firm* — Mahamedi Paradice Kreisman LLP; Lance M. Kreisman

(57) ABSTRACT

A multi-mode transmitter within an integrated circuit device. The multi-mode transmitter transmits a first data sequence in a baseband signal when a first transmission mode is enabled, and transmits the first data sequence in a multi-band signal when a second transmission mode is enabled.

21 Claims, 8 Drawing Sheets

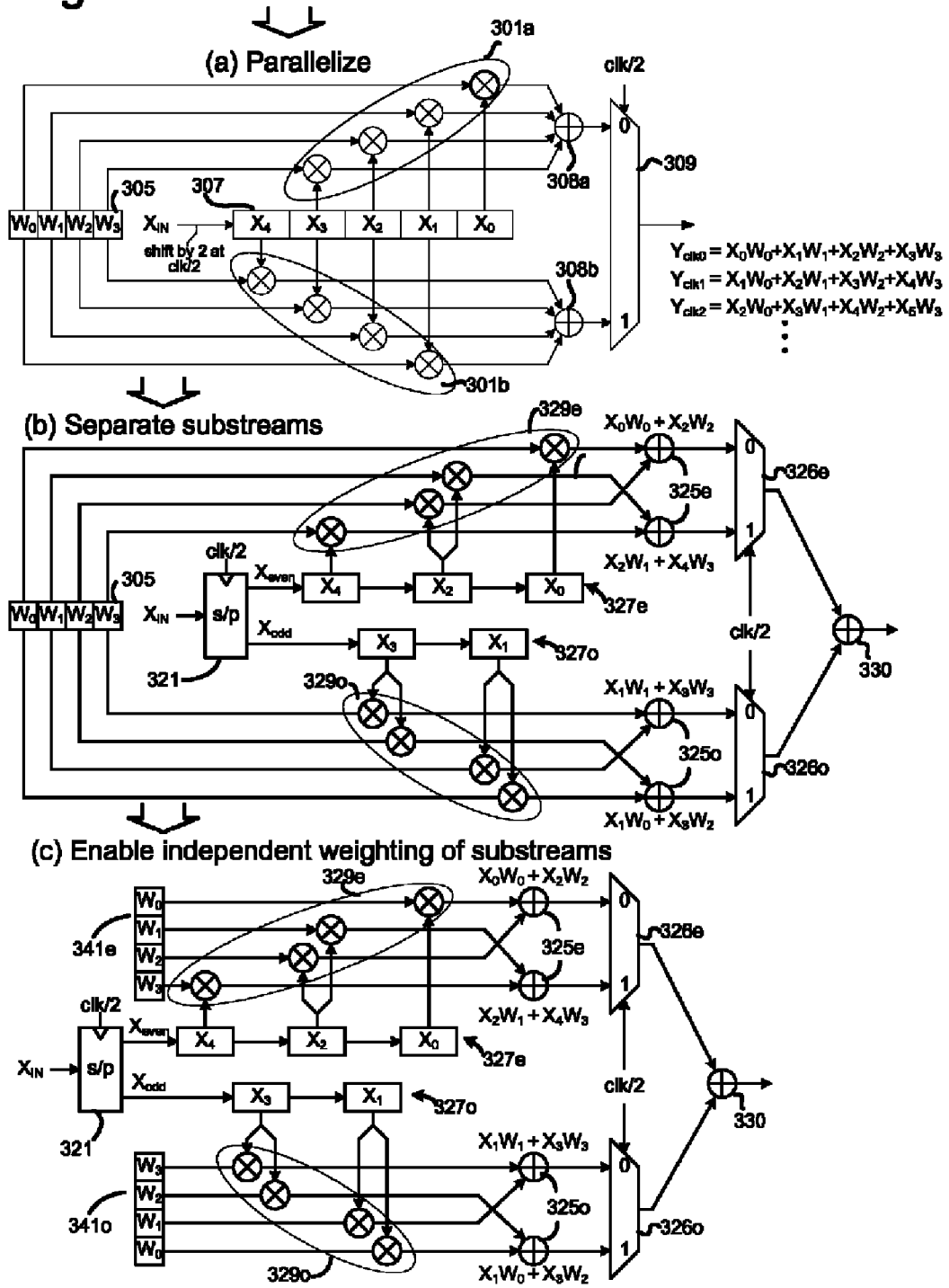

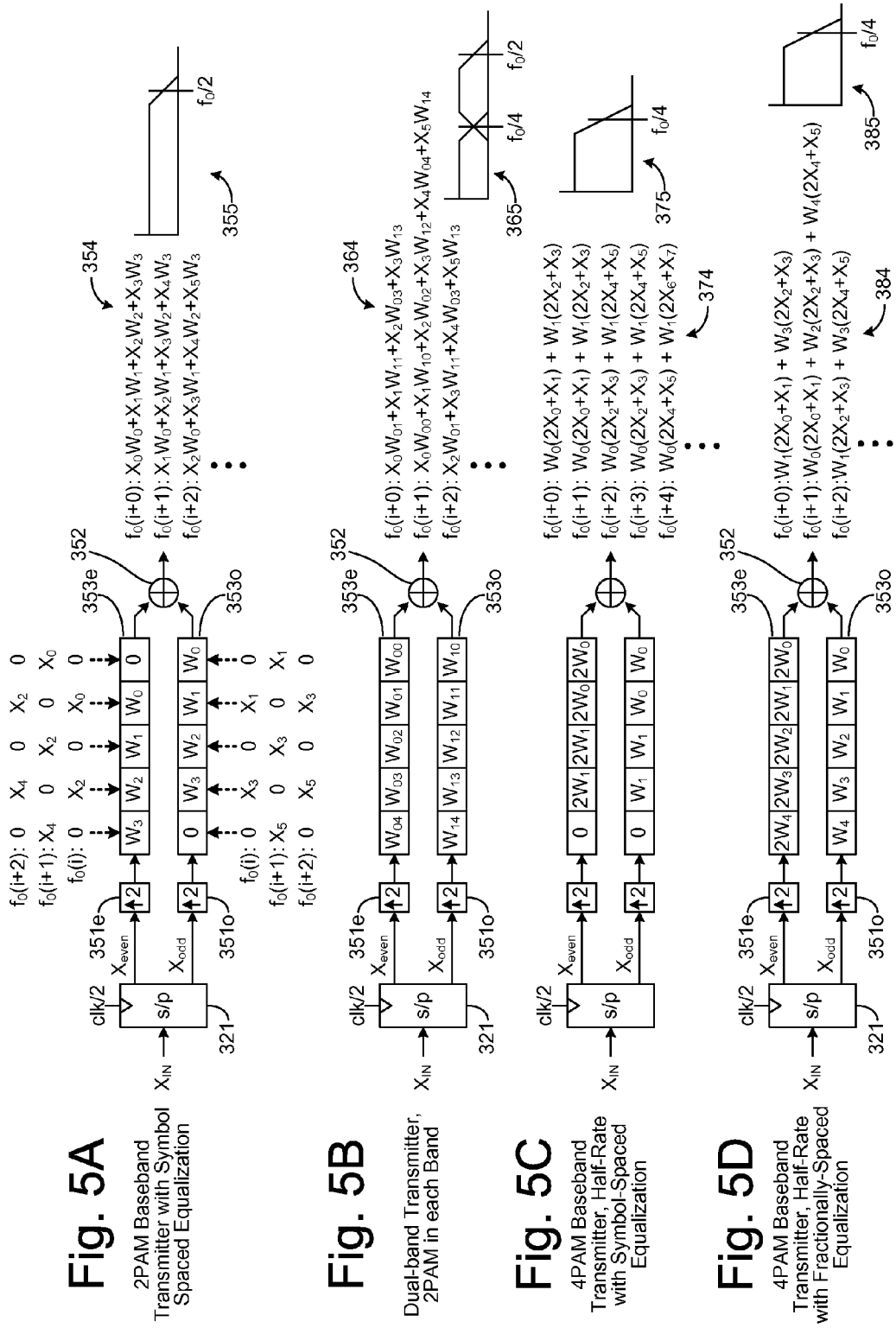

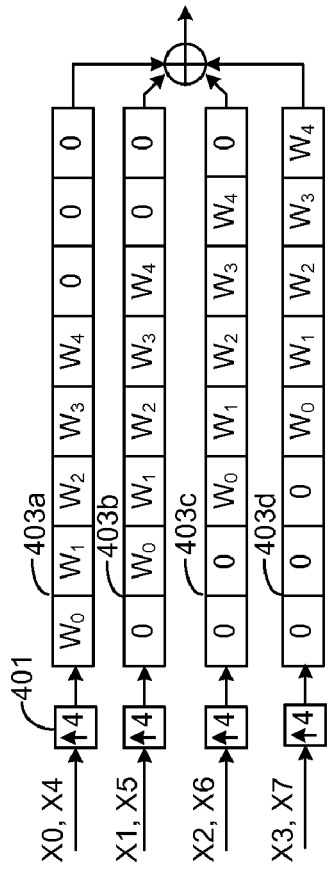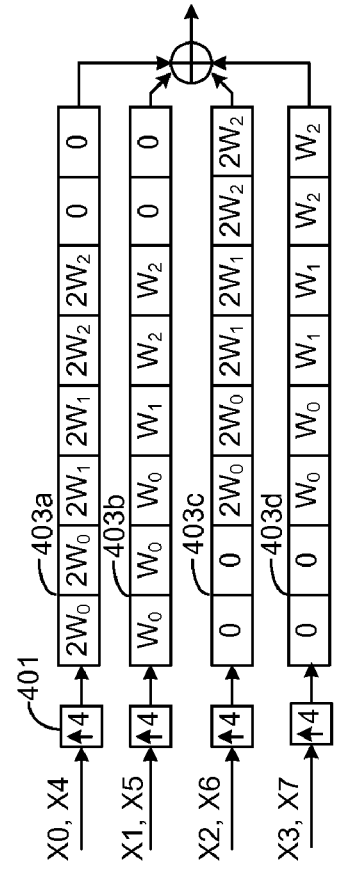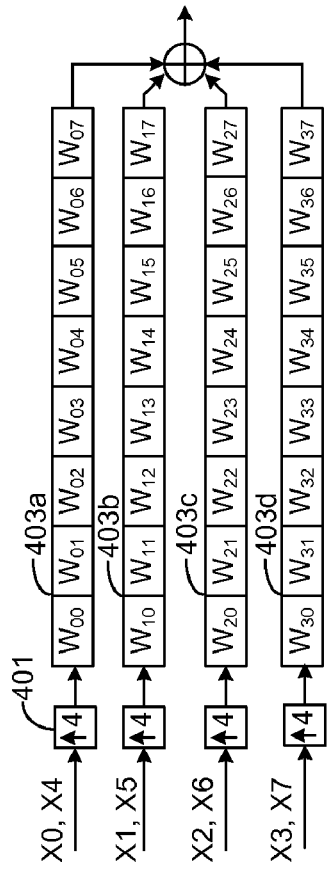
Fig. 6A
2PAM Baseband Symbol Spaced
Fig. 6B
4PAM Baseband Symbol Spaced
Fig. 6C
4-Channel AMT 2-PAM each per channel 2-Channel AMT
4-PAM each
4x over-sampled per channel 2-Channel AMT
2-PAM each
2x over-sampled per channel Baseband
2x over-sampled
4-PAM

MULTI-MODE TRANSMITTER

CROSS-REFERENCE TO RELATED APPLICATIONS

This application claims priority from U.S. Provisional Application No. 60/943,537 filed Jun. 12, 2007, entitled "A 24 Gb/s Software Programmable Multi-Channel Transmitter," and from U.S. Provisional Application No. 61/021,626 filed Jan. 16, 2008, entitled "Multi-Mode Transmitter," both of which are hereby incorporated by reference in their entireties.

TECHNICAL FIELD

The disclosure herein relates to high-speed signaling between and among integrated circuit devices.

BACKGROUND

FIG. 1A illustrates a conventional chip-to-chip signaling system 100 that employs transmit-side and receive-side equalization to compensate for channel imperfections. More specifically, transmitter 101 is implemented by a finite-impulse-response filter in which the bit to be transmitted and neighboring bits are loaded into a shift register 104 and multiplied by respective filter weights in multipliers 105. The multiplier outputs are summed (106) to produce a final signal that is driven onto a transmission-line signaling link 102 by line driver 107. By this arrangement, intersymbol interference and other channel effects may be compensated to produce a more open data eye (i.e., larger signal amplitude and/or duration) at the receiver 103. On the receive side, a decision-feedback equalizer (formed by amplifier 114, bit-slice circuit 115, shift register 116, filter-weight multipliers 117 and summing circuitry 118) contributes to the received waveform in a negative-feedback arrangement to further open the data eye, compensating for impedance discontinuities (e.g., at connectors 110a/110b or at the junction between the signaling link 102 and the transmitter 101 and/or receiver 103).

When operated in conjunction with a point-to-point signaling link or other signaling channel which is relatively free of reflection sources (e.g., stubs and impedance discontinuities), the equalized transmitter/receiver pair of FIG. 1A may achieve extremely high signaling rates, for example, approaching or exceeding 10 GHz. Unfortunately, as shown in FIG. 1B, the multi-drop signaling topologies common in memory systems and other high-bandwidth applications tend to exhibit band-limiting notches $121a$-$121z$ (i.e., intervals of attenuated frequency-response due at least in part to the reflection-inducing stubs at each drop along the signaling path), that often limit the top end signaling rate to the frequency of the lowest-frequency notch (e.g., ~1 GHz as shown at $121a$ in the multi-drop frequency response of FIG. 1B).

FIG. 2 illustrates a recently proposed system 140 that employs multi-band signaling to exploit notch-bounded passbands in the signaling channel and thus overcome the notch-limited bandwidth of the baseband-only approach of FIG. 1A. More specifically, multiple data streams ($X_0$-$X_{N-1}$) are supplied to distinct transmission branches of transmitter 141, each transmission branch including a low-pass-filter $143_0$-$143_{N-1}$ and (except for a baseband branch) up-converter $144_1$-$144_{N-1}$ to generate spectrally-differentiated signals that may be wire-summed (145) and conveyed in respective notch-bounded passbands of the signaling channel. In the receiver 151, counterpart down-conversion ($153_1$-$153_{N-1}$) and low-pass filtering ($155_0$-$155_{N-1}$) operations are performed to recover multiple baseband signals which are supplied to respective bit-slice circuits $157_0$-$157_{N-1}$ (i.e., circuits for distinguishing between signal levels) to recover the originally transmitted data streams.

While the multi-band signaling arrangement of FIG. 2 provides significant advantages over the base-band-only approach when faced with band-limiting notches, the multi-band transmitter 141 suffers an increased peak-to-average power ratio relative to the baseband-only transmitter of FIG. 1 and thus is less efficient in terms of energy-per-bit and therefore may less desirable in those instances in which a channel without band-limiting notches is available.

BRIEF DESCRIPTION OF THE DRAWINGS

The disclosure herein is illustrated by way of example, and not by way of limitation, in the figures of the accompanying drawings and in which like reference numerals refer to similar elements and in which:

FIG. 4 illustrates a reconstruction of a baseband transmitter to achieve an architecture that may, with modification to equalization coefficients, generate a multi-band output signal instead of a baseband-only output;

FIGS. 5A-5D illustrate different coefficient matrices that may be programmed within the independent coefficient storage bank architecture of FIG. 4;

FIGS. 6A-6F illustrate different coefficient matrices that may be programmed within a four-branch unified transmitter architecture to yield a variety of different transmission modes.

DETAILED DESCRIPTION

A signal transmitter capable of operating in either a baseband mode or multi-band mode and referred to herein as a multimode transmitter is disclosed in various embodiments. In one embodiment, independent baseband and multi-band transmission branches provided within a multimode transmitter may be alternately enabled to drive a signaling link according to a transmit mode selection. In another embodiment, the baseband and multi-band transmission functions are merged within a unified transmitter architecture, with transmit mode selection achieved through programming of equalizer coefficients. The unified transmitter architecture may additionally support PAM (pulse amplitude modulation) signaling modes in which each PAM symbol conveys more than a single bit of information (i.e., multi-PAM signaling as opposed to binary or 2PAM signaling). Further, combinations of multi-PAM and multi-band may be supported, as well as symbol-spaced and fractional equalization.

Figure 3:
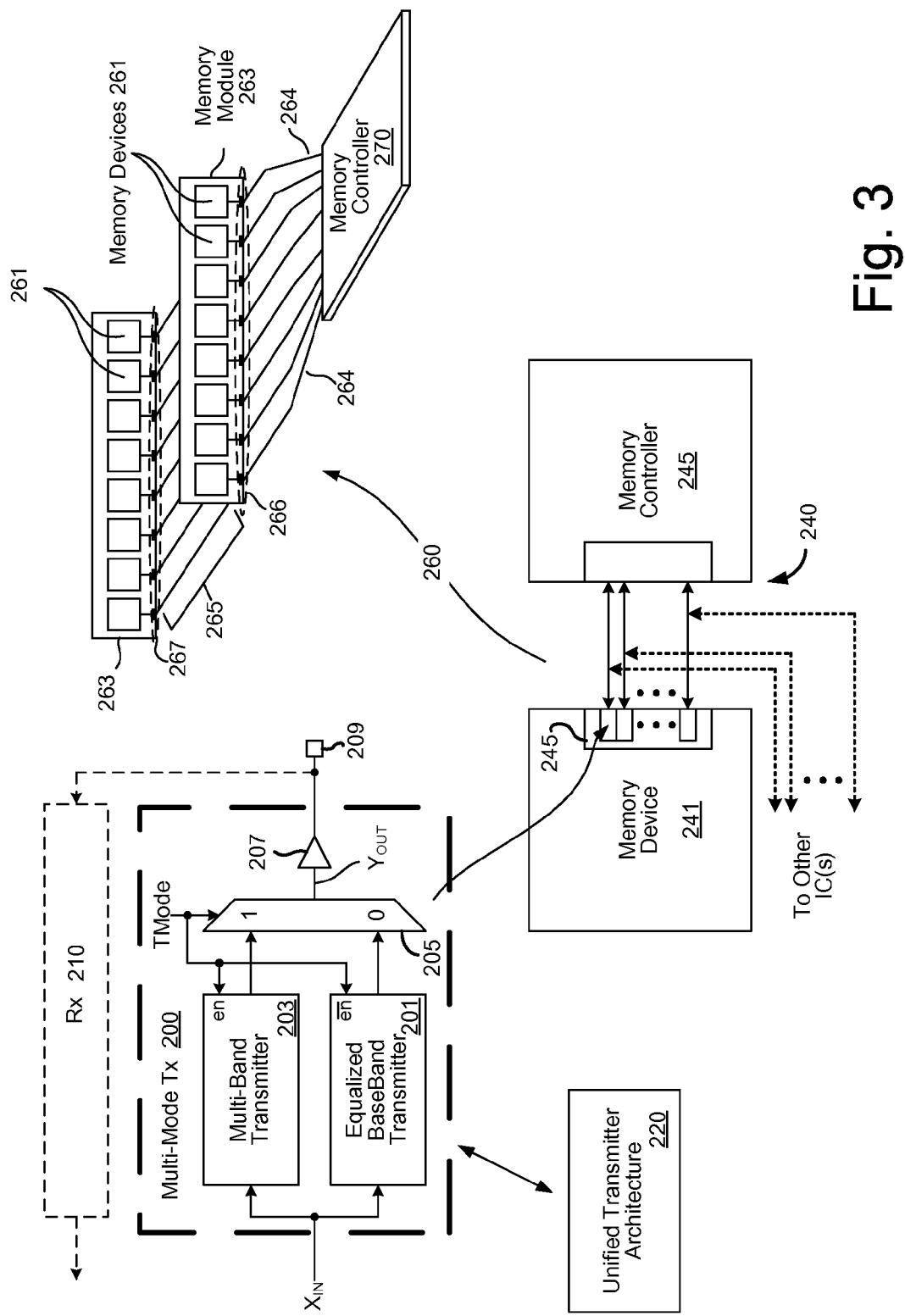
FIG. 3 illustrates an embodiment of a multi-mode transmitter having separate baseband and multi-band transmission branches.

FIG. 3 illustrates an embodiment of a multi-mode transmitter 200 having separate baseband and multi-band transmission branches 201 and 203, the outputs of which are selectively coupled, via multiplexer 205 and optional line driver 207, to an output node 209 of an integrated circuit device (i.e., an integrated circuit die or chip). In the particular embodiment shown and other embodiments disclosed below, the output node 209 is a pad for direct or eventual wired connection to a single-ended or differential external signaling link. In alternative embodiments, the output node 209 may be capacitively or inductively coupled to an external signaling medium. Also, the line driver 207 may be combined with multiplexer 205 or included within the individual baseband and multi-band transmission branches prior to multiplexing. Further, while the line driver 207 and corresponding structures described below may be implemented by an electrical signal driver (e.g., to sink and/or source current to impress symbols indicated by the output of the multiplexer 205 onto the signaling link), the line driver 207 may alternatively generate an optical output signal, performing an electrical-to-optical conversion which is reversed within a receiving device. Also, the multi-mode transmitter 201 may drive a unidirectional signaling link or may be paired with a receiver 210 to form a transceiver for bidirectional signaling.

In one embodiment, a transmit mode signal (TMode) is supplied to the multiplexer 205 to control the selection between the baseband and multi-band transmission branches 201 and 205 (i.e., selecting the signal generated by one or the other to be output to the line driver). Alternatively, the multiplexer 205 may be omitted and the outputs of the two transmission branches 201, 203 may be wire-summed (i.e., output nodes joined), with one of the transmission branches disabled (e.g., tri-stated) and the other enabled to supply an output signal to the line driver 207. In the particular embodiment shown, the multiplexer 205 is provided for transmission-branch selection and the transmission branches 201, 203 are alternately enabled and disabled by the transmission-mode signal, for example, to avoid power consumption in the non-transmitting branch.

As mentioned briefly above, the separate-branch transmitter architecture 200 may be replaced by a unified transmitter architecture 220 in an alternative embodiment. As described in detail below, the transmission mode selection within the unified architecture 220 may be effected through programming of equalizer coefficients. Accordingly, while a transmit mode signal (TMode) may be used to control operation of the unified transmitter architecture (e.g., selecting one source of coefficients or another), the transmit mode signal may alternatively be omitted, and the coefficient storage bank reprogrammed as necessary to enable the desired transmission mode.

FIG. 3 also illustrates an exemplary memory system 240 that includes a memory device 241 and memory controller 243 and in which the multi-mode transmitter (200 or 220) may be used. For example, as the memory device 241 may be a general purpose device whose system application is unknown at the time of manufacture, it may be desirable to provide multi-mode transmitters within the input/output (I/O) interface 245 to enable the memory device to be applied in a variety of different systems. That is, if applied within a point-to-point signaling system, high-speed baseband transmission may be enabled and, if applied within a multi-drop signaling system or other environment in which multi-band signaling provides bandwidth advantages, multi-band transmission may be enabled. More generally, the transmission mode may be selected according to the capabilities of the receiver; baseband mode for a baseband receiver and multi-band mode for a multi-band receiver. In yet other applications where the receiver supports both baseband and multi-band signaling modes, the memory device may be deployed in a system initially configured for point-to-point signaling and then later reconfigured to support multi-drop signaling (or vice-versa), in which case the signaling mode of the multi-mode transmitter would be changed from an initial baseband configuration to a multi-band configuration. An example of such a reconfigurable system is depicted at 260. Initially, a set of memory devices 261 optionally disposed on a memory module and having multi-mode transmission capability may be coupled to a memory controller 270 via respective point-to-point signaling paths 264. As shown, a remaining portion or segment 265 of each signaling path 264 that extends to an unused module connector or socket 267 (or multiple connectors or sockets) may be switchably decoupled from the point-to-point portion or segment of signaling path 264 (e.g., through mechanical switches or transistor switches) to avoid reflection-inducing stubs. Later, when added memory capacity is desired, the previously decoupled portion 265 of each signaling path 264 may be switchably coupled to the portion of signal path 264 that extends from the memory controller to the first module connector 266, thereby forming a multi-drop signaling path that supports controller communication with both memory modules 263 (and more specifically, with the memory devices 261 thereon). In such an embodiment, the memory controller 270 may determine the system configuration (e.g., by reading serial-presence-detect (SPD) storage devices or detecting other indicia of the signaling topology) and program the appropriate signaling mode within the individual memory devices 261 through issuance of mode-setting commands to the memory devices.

Still referring to FIG. 3, it should be noted that the multi-mode transmitter is not limited to application in memory devices (e.g., may be applied within a buffer IC on a registered memory module) or even memory systems. Rather, wherever it may be desirable to support multiple modes of communication, whether such mode selection is to be made during production time or during device operation, the multi-mode transmitter may be applied.

Figure 1A:
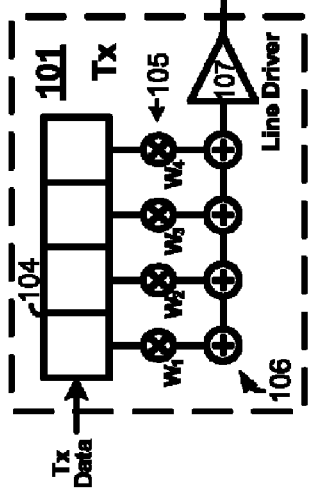
FIG. 1A illustrates a conventional chip-to-chip signaling link that employs transmit-side and receive-side equalization to compensate for channel imperfections.
Figure 1B:
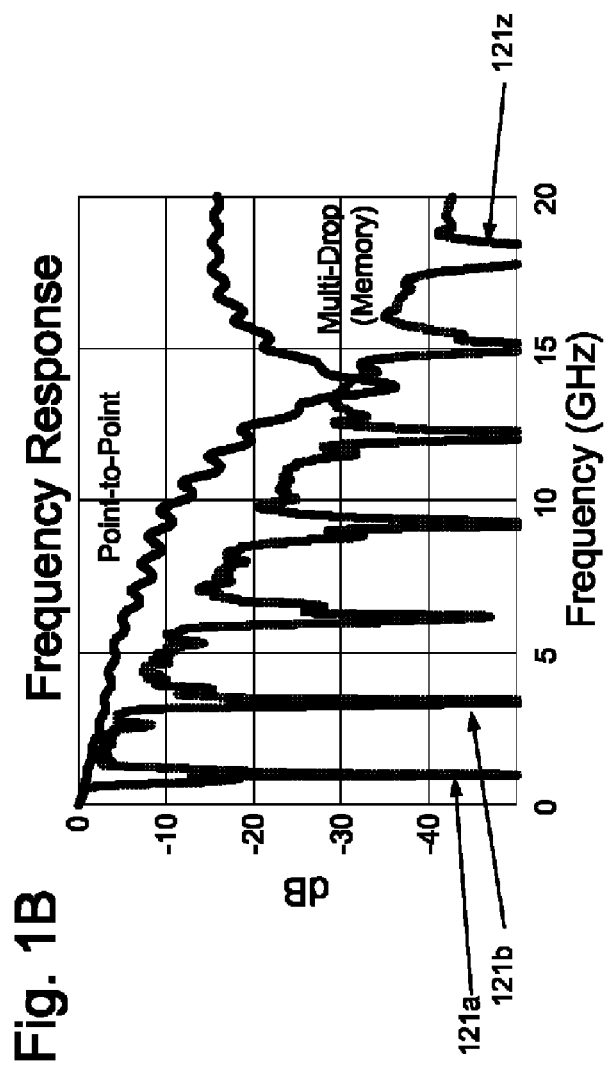
FIG. 1B is a frequency response diagram illustrating various frequency responses of signaling systems, including the signaling system of FIG. 1A.

FIG. 4 illustrates a reconstruction of a baseband transmitter to achieve an architecture that may, with modification to equalization coefficients, generate a multi-band output signal instead of a baseband-only output. More specifically, by parallelizing the application of the equalizer coefficients (i.e., also referred to herein as "tap weights" as such values operate as relative scaling factors or weights for the individual taps of an equalizer) to the incoming data stream such that the incoming data values (e.g., bits) may be shifted into the transmitter in pairs; then separating the pairs of data values so that the component values within each pair are delivered to separate circuit branches and thus for separate substreams of the input data stream; and then enabling independent weighting of the separate substreams instead of the single set of weights applied in the conventional baseband transmitter of FIG. 1A, a flexible transmitter architecture that may support either 2PAM baseband, 4-PAM baseband or multi-band transmission merely through equalizer coefficient selection is realized.

With regard to the parallelizing shown at "(a) Parallelize", two sets of multipliers 301*a* and 301*b* are provided (instead of a single set) to enable tap weight multiplication for a given output interval clk0 (i.e., a cycle of the transmit clock signal) and tap weight multiplication for the immediately succeeding output interval, clk1, to be carried out concurrently over a two-clock cycle period. As shown, equalizer coefficients $W_0$-$W_3$ are stored within equalizer storage bank 305 and supplied to the first set of multipliers 301*a* for multiplication with data at the positions within shift register 307 occupied, during the two-clock-cycle interval shown, by values $X_0$-$X_3$, respectively, and also to a second set of multipliers 301b for multiplication with data at the shift register positions occupied, during the interval shown, by values $X_1$-$X_4$. Thus, the incoming data stream ($X_{IN}$) is shifted, two-bits at a time, into the data shift register every other clock cycle (i.e., at rate clk/2). During the first of two clock cycles in which a given set of data ($X_0$-$X_4$) is resident within the data shift register 307, half-rate clock signal, clk/2, is low and thus selects a sum of the multiplier outputs $X_0W_0$, $X_1W_1$, $X_2W_2$ and $X_3W_3$ to be output via multiplexer 309, and during a second of the two clock cycles (i.e., when clk/2 is high), selects the sum of the multiplier outputs $X_1W_0$, $X_2W_1$, $X_3W_2$, $X_4W_3$ to be output via multiplexer 309. This output sequence is shown in FIG. 4 as the sequence:

$$Yclk0 = X_0W_0 + X_1W_1 + X_2W_2 + X_3W_3$$

$$Yclk1 = X_1W_0 + X_2W_1 + X_3W_2 + X_4W_3$$

$$Yclk2 = X_2W_0 + X_3W_1 + X_4W_2 + X_5W_3$$

.

.

.

Recognizing that a key aspect of multi-band transmission is to transmit separate substreams of data from an input stream in different frequency bands, the parallelized baseband architecture of FIG. 4(a) may be reorganized as shown at "(b) Separate substreams" to reflect the separated substream filtering of a multi-band approach. Thus, the incoming signal is supplied to a serial-to-parallel converter 321, with the first and second values of each pair within a sequence of pairs forming first and second data streams (i.e., even data stream X0, X2, X4, . . . and odd data stream X1, X3, X5, . . . ) that are directed to respective data shift registers 327e, 327o and multiplier sets 329e, 329o (i.e., the even data shift register 327e and multiplier set 329e, and the odd data shift register 327o and multiplier set 329o). The outputs of the even multiplier set 329e are paired and summed within respective summing circuits (shown collectively by 325e) to generate even-phase output term $X_0W_0 + X_2W_2$ and odd-phase output term $X_2W_1 + X_4W_3$. Similarly, the outputs of the odd multiplier set are paired and summed within respective summing circuits to generate even-phase output term $X_1W_1 + X_3W_3$ and odd-phase output term $X_1W_0 + X_3W_2$. Accordingly, multiplexers 326e and 326o are provided and controlled by the clk/2 signal to select, during an even phase of the clk/2 signal, the even phase terms to be output to summing circuit 330, and to select, during the subsequent odd phase of the clk/2 signal, the odd-phase terms to be output to the summing circuit 330, thus producing the same symbol-spaced baseband output sequence as in the parallelized transmitter representation of FIG. 4, part (a).

As a final refinement, independent coefficient storage banks 341e and 341o are provided for the even and odd substreams as shown in FIG. 4, part (c) (i.e., "(e) Enable independent weighting of substreams"). While not necessary for symbol-spaced baseband signal generation, the independent coefficient storage banks permit different filters to be applied to the separate substreams and thus enable the transmitter to be configured for alternative transmission modes merely by reprogramming the equalizer coefficients. As discussed below, for example, instead of base-band only transmission, the equalizer coefficients may be reprogrammed to effect transmission of the separate data substreams in respective frequency bands, or to contribute different levels of significance in a multi-PAM output.

FIGS. 5A-5C illustrate different coefficient matrices that may be programmed within the final (independent coefficient storage bank) architecture of FIG. 4, in this case illustrated in up-sampled notation (implicitly representing the multiplexing operations described above). That is, in FIG. 5A which illustrates the same 2PAM baseband transmission mode (with symbol-spaced equalization) as in the final architecture of FIG. 4, during a first cycle of a clock signal having frequency $f_0$, factor-of-two upsampling (351e, 351o) of the even and odd data substreams generated by serial-to-parallel converter 321 results in insertion of a zero before each value in the two substreams. Thus, $X_0, X_2, X_4$ becomes $0, X_0, 0, X_2, 0, X_4$; and $X_1, X_3, X_5$ becomes $0, X_1, 0, X_3, 0, X_5$. To account for the order in which the leading tap weight $W_0$ is applied to the even and odd substreams (i.e., first to the even substream and then to the odd), the even substream equalizer coefficients 353e are shifted forward in time (i.e., to the left relative to the incoming substream) by one cycle of the clock signal relative to the incoming substream (i.e., to the left relative to the odd substream coefficients 353o). By this arrangement, during cycle 'i' of the clock signal (i.e., $f_0(i+0)$) $X_0W_0 + X_2W_2$ from the even substream processing and $X_1W_1 + X_3W_3$ from the odd substream processing are combined (i.e., in summing circuit 352, which may be a wired summation) to yield the desired output: $X_0W_0 + X_1W_1 + X_2W_2 + X_3W_3$ as shown at 354. The up-sampled substreams are shifted forward one coefficient position per clock cycle so that, during the subsequent clock cycle (i.e., $f_0(i+1)$), $X_2W_1 + X_4W_3$ is supplied by the even substream branch and $X_1W_0 + X_3W_2$ is supplied by the odd substream branch to yield the output shown at 354. During the following clock cycle ($f_0(i+2)$), $X_2W_0 + X_4W_2$ is supplied from the even branch and $X_3W_1 + X_5W_3$ is supplied from the odd branch to generate the output shown at 354, and so forth. A spectral representation of the base-band only output is shown at 355.

Figure 2:
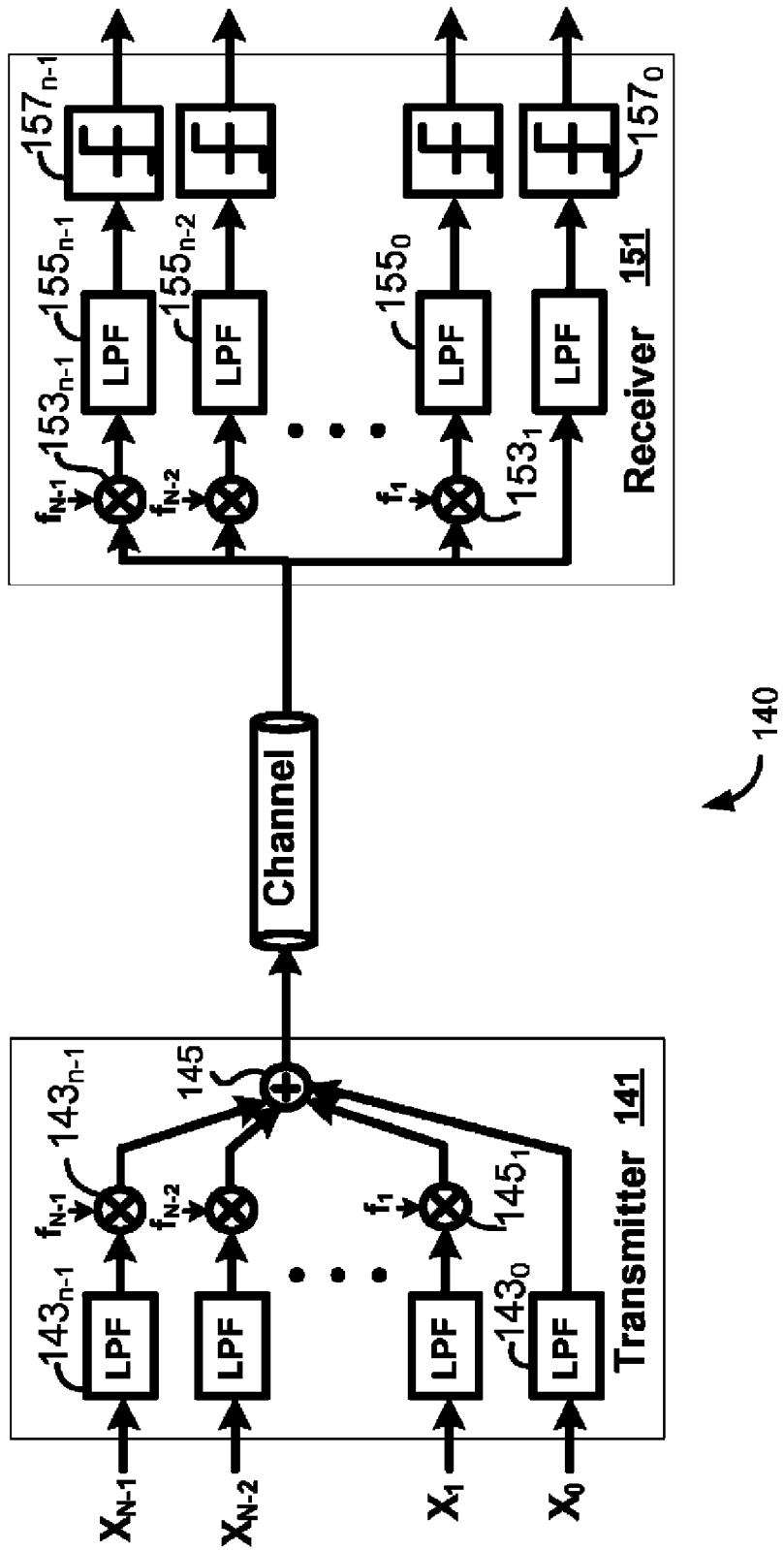
FIG. 2 illustrates a multi-band signaling system.

Referring to FIG. 5B, considering the Xeven and Xodd data streams as separate input sequences, the equalizer corresponding to each sequence (353e, 353o) is operating at a rate that permits shaping the spectrum of the equalizer output from DC to $f_0/2$. In effect, the equalizers perform the low-pass filtering and upconversion functions illustrated in FIG. 2, and may additionally perform signal equalization. For example, the equalizer may implement a low pass filter extending from DC to a cutoff frequency (i.e., −3 db) at $f_0/4$, or a high-pass filter extending from a cutoff frequency at $f_0/4$ to $f_0/2$. A bandpass filter may also be implemented. Thus, the outputs of the equalizers may be spectrally differentiated (by application of different equalizer coefficients as shown by the output expressions at 364) and wire-summed to produce a multi-band output signal as shown in the spectral representation at 365.

FIG. 5C illustrates yet another coefficient mapping that may be applied within the same transmitter architecture as that shown in FIGS. 5A and 5B (and the final, dedicated coefficient storage bank implementation of FIG. 4) to yield a 4-PAM baseband signal at f0/2 (i.e., half the data rate of the 2PAM signal). More specifically, applying the data-to-coefficient alignment demonstrated in FIG. 5C, $X_0$ is multiplied by coefficient $2W_0$, while bit $X_1$ is multiplied by coefficient $W_0$, thus yielding the 4-PAM output term $W_0(2X_0 + X_1)$ in which the significance of the even substream component, $X_0$, is double that of the corresponding odd substream component, $X_1$. The overall 4-PAM output during cycle $f_0(i+0)$ additionally includes the term $W_1(2X_2 + X_3)$, thus providing a two-tap symbol-spaced equalization as shown at 374. During cycle $f_0(i+1)$, the even and odd substreams are weighted by the same values as in cycle $f_0(i+0)$, thus repeating the 4-PAM output and effecting a half-data rate (one symbol for every two clock cycles of a clock signal at frequency $f_0$ or for every cycle of a clock signal oscillating at $f_0/2$). During the subsequent two clock cycles, $f_0(i+2)$ and $f_0(i+3)$, $X_2$ is weighted by $2W_0$ and $X_4$ is weighted by $2W_1$, $X_3$ is weighted by $W_0$ and $X_5$ is weighted by $W_1$, thus producing the 4-PAM output shown at 374. In the ensuing pair of clock cycles, of which only $f_0(i+4)$ is shown, $X_4$ is weighted by $2W_0$, $X_6$ is weighted by $2W_1$, $X_5$ is weighted by $W_0$ and $X_7$ is weighted by $W_1$ to produce an updated 4-PAM output. A spectral arrangement representation of the base-band only 4-PAM output is shown at 375.

FIG. 5D illustrates application of yet another coefficient matrix arrangement within the same transmitter architecture as FIGS. 5A-5C, in this case with 2×-scaled tap weights applied to the even and odd data streams as in FIG. 5C (thus yielding a 4-PAM output as shown at 384), but without replicating the tap weights in each $f_0$ cycle. By this arrangement, a 4-PAM output with fractionally spaced equalization is achieved as demonstrated by the output equations shown at 384 and the spectral representation shown at 385.

Figure 6D:
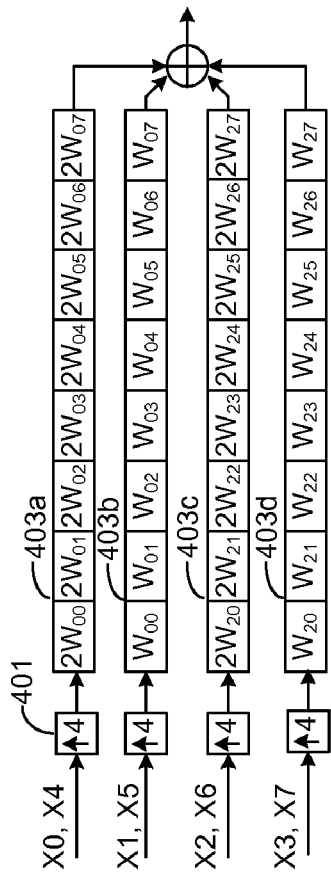
Figure 6E:
Figure 6F:
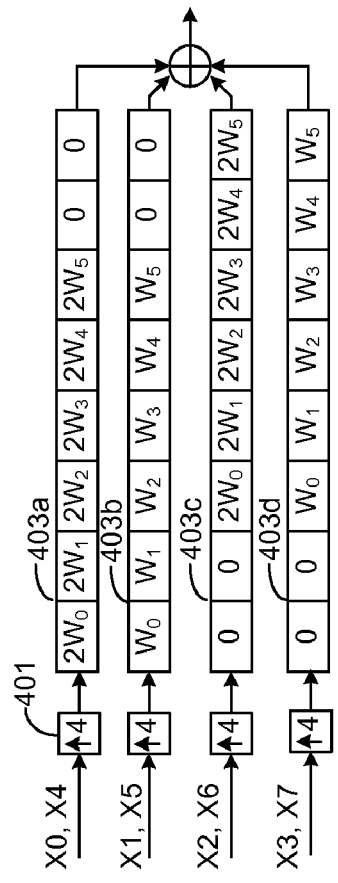

FIGS. 6A-6F illustrate different coefficient matrices that may be programmed within a four-branch unified transmitter architecture to yield a variety of different transmission modes. In the embodiments shown, 4× serial-to-parallel conversion (circuit not shown) is applied to deliver four data substreams to respective transmitter branches, each represented by a 4× up-sampling operation 401 and respective equalizer 403a-403d. Thus, values $X_0, X_4, X_8, \ldots$ are supplied to equalizer 403a (referred to collectively, with the corresponding up-sampler 401 as branch 'a'); $X_1, X_5, X_9, \ldots$ are supplied to branch 'b'; $X_2, X_6, X_{10}, \ldots$ are supplied to branch 'c' and $X_3, X_7, X_{11}, \ldots$ are supplied to branch 'd'. Because four substreams are provided, combinations of PAM and multi-band signaling modes become possible. For example, FIG. 6A illustrates a coefficient matrix that yields a 2PAM baseband output signal with symbol-spaced equalization (a five-tap equalizer is shown, though there may be more or fewer taps); FIG. 6B illustrates coefficient matrix that yields a 4-PAM baseband output signal with symbol-spaced equalization and half-rate transmission (a three-tap equalizer is shown); FIG. 6C illustrates coefficient matrix that yields a four-channel multi-band (also referred to herein as analog multi-tone (AMT)); FIG. 6D illustrates coefficient matrix that yields a combination of multi-band and 4-PAM transmission (two-channel multi-band, each channel conveying a 4-PAM signal); FIG. 6E illustrates coefficient matrix that yields two-channel multi-band with each channel conveying a 2PAM signal; and FIG. 6F illustrates a baseband 4-PAM transmitter. In the arrangement of FIG. 6D each multi-band component is four-times oversampled, in effect providing quarter-cycle fractionally spaced equalization. In FIGS. 6E and 6F, two-times oversampling is effected.

As discussed in reference to the unified transmitter architecture of FIGS. 5 and 6, because the equalizer coefficients may be programmed during device operation, the mode of the transmitter may be established by programming a predetermined set of coefficients within the coefficient storage registers and/or through continuous adaptation using feedback from the receiver. In the case of adaptive coefficient determination, the coefficients may be adapted as necessary to carry out the transmission mode that yields the most efficient output from whatever cost function is applied to determine signal error. For example, the transmitter may begin transmission in one mode and then adapt to a different mode and even to a third mode or return to the first mode or to a convergence between a pair of modes as the error measurement dictates. For example, if the receiver is a baseband receiver, the coefficients may converge to those corresponding to baseband transmission mode, but even then the zero-valued taps within the baseband configuration may not adapt exactly to zero values due to adaptation errors, or due to mismatch between the paths from different transmitter branches to the transmitter output, etc.

Figure 7:
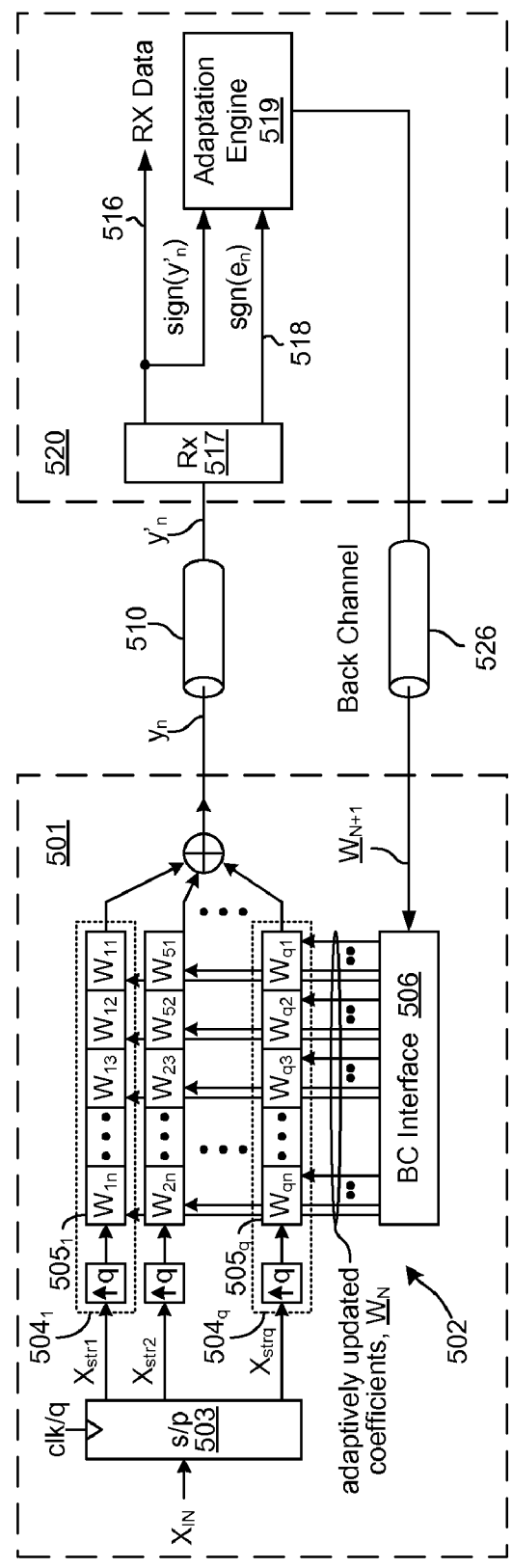
FIG. 7 illustrates an embodiment of a signaling system having a unified, multi-mode transmitter disposed within a first integrated circuit die and coupled through a signaling channel to a receiver disposed within a second integrated circuit die.

FIG. 7 illustrates an embodiment of a signaling system 500 having a unified, multi-mode transmitter 502 disposed within a first integrated circuit die 501 and coupled through a signaling channel 502 to a receiver 517 disposed within a second integrated circuit die 520. In the embodiment shown, the unified, multi-mode transmitter 502 includes q transmission branches 504$_1$-504$_q$, each receiving a respective one of q data streams, $X_{str1}$-$X_{str(q)}$ from a serial-to-parallel converter 503 and effecting a times-q up-sampling operation (↑q) and filtering of the corresponding data stream in a respective one of equalizer branches 505$_1$-505$_q$. In one embodiment, the receiver 517 includes one or more samplers that sample the incoming symbol stream and outputs, for each sampled symbol, a data value and error value (sign(y'n) and sign(en)) to an adaptation engine 519. The adaptation engine 519 adaptively updates equalizer coefficient values to be applied within the transmitter (and, optionally, within the receiver as well) based on one or more cost functions (which may be programmatically determined or selected) to generate, in successive adaptation cycles, updated sets of coefficients that may be returned to the unified transmitter 502 via a back channel 526. In one embodiment, for example, the adaptation engine 519 includes circuitry to apply sign-sign LMS (least-mean-square) error correction to determine an updated set of equalizer coefficients in each adaptation cycle, though other cost functions may be used. Also, with respect to the error information provided to the adaptation engine 519, the receiver 517 may determine an error in the signal level relative to one or more expected levels (e.g., by comparing the incoming signal with an expected level returned, for example, from the adaptation engine), based on eye opening (e.g., weighted sum of eye closures) or on a timing error, bit error rate (e.g., as determined through comparison of parity, error-code-correction, checksum, cyclic-redundancy check, or other information conveyed in the incoming data with corresponding check-values generated based on the received data) or any other manner of determining signaling error.

Within IC 501, a back-channel interface circuit 506 (BC Interface) receives the updated coefficients via the back channel 526 and loads the updated coefficients into the appropriate coefficient storage registers of equalizer branches 505$_1$-505$_q$. In one embodiment, the coefficients are loaded one by one as received, though the coefficients may alternatively be gathered as a group for the entire coefficient matrix (or any portion thereof) and then loaded in a single load operation per adaptation cycle. Also, while the adaptation engine 519 within IC 520 may determine updated sets of coefficients and transfer the updated sets to the transmitter 502 via the back channel 526 as shown, adaptation logic may alternatively be disposed on IC 501 along with transmitter, so that IC 520 merely need send back the error information (or error/data pairs) generated by the receiver 517 or the coefficient changes needed to a given set of coefficients to produce the updated set.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. An integrated circuit device comprising:
    an output node including a pad for coupling to a wired transmission line;
    a plurality of equalizer circuits including coefficient storage circuits for storing selected tap coefficients; and
    wireline transmission circuitry coupled to the output node and to output via the output node for wireline transmission along the wired transmission line either a baseband signal or a multi-band signal based on the selected tap coefficients.

2. The integrated circuit device of claim 1 wherein the wireline transmission circuitry comprises a multi-band transmitter, a baseband transmitter and a multiplexer having inputs coupled to respective outputs of the multi-band transmitter and baseband transmitter, the multiplexer having an output coupled to the output node.

3. The integrated circuit device of claim 2 further comprising a mode selection register to output to the multiplexer a logic signal that represents the transmission mode selection.

4. The integrated circuit device of claim 1 wherein the wireline transmission circuitry comprises:
    a serial-to-parallel converter to generate a plurality of data substreams from an input data stream;
    a plurality of equalizer circuits each coupled to receive a respective one of the data substreams and having a respective coefficient storage circuit for storage of coefficients to be multiplied with values in the respective one of the data substreams; and
    a summing element to combine the outputs of the plurality of equalizer circuits to generate an output signal to be transmitted via the output node.

5. The integrated circuit device of claim 4 wherein the summing element is a node at which outputs of the plurality of equalizer circuits are coupled to one another to effect a wired summation.

6. The integrated circuit device of claim 4 wherein, when a first set of coefficients is stored within the coefficient storage circuits of the plurality of equalizer circuits to effect a first mode selection, the transmitter is enabled to convey a transmit data sequence in a baseband transmission, and, when a second set of coefficients is stored within the coefficient storage circuits of the plurality of equalizer circuits to effect a second mode selection, the transmitter is enabled to convey the transmit data sequence in a multi-band transmission.

7. The integrated circuit device of claim 6 wherein, when a third set of coefficients is stored within the coefficient storage circuits of the plurality of equalizer circuits to effect a third mode selection, the transmitter is enabled to convey a transmit data sequence in a multi-PAM (Pulse Amplitude Modulation) transmission in which each transmitted symbol conveys more than a single bit of the transmit data sequence.

8. The integrated circuit device of claim 4 wherein, a baseband output signal is generated by coefficients within a coefficient storage circuit that corresponds to a first one of the data substreams that are a time displaced version of coefficients within a coefficient storage circuit that corresponds to a second one of the data substreams.

9. The integrated circuit device of claim 4 wherein, a multi-band output signal is generated by coefficients within a coefficient storage circuit that corresponds to a first one of the data substreams effect a first filtering operation, and by coefficients with that selects a be a time displaced version of the coefficients within a coefficient storage circuit that corresponds to a second one of the data substreams effect a second filtering operation, the first filtering operation yielding an output signal component that is spectrally offset from an output signal component yielded by the second filtering operation.

10. A method comprising:
equalizing in a plurality of equalizers including coefficient storage for storing selected tap coefficients;
transmitting a first data sequence in a baseband signal along a wired transmission line when a first transmission mode is enabled based on the selected tap coefficients; and
transmitting the first data sequence in a multi-band signal along the wired transmission line when a second transmission mode is enabled based on the selected tap coefficients.

11. The method of claim 10 further comprising:
switchably coupling a baseband transmitter to an output node of an integrated circuit device when the first transmission mode is enabled, and
switchably coupling a multi-band transmitter to the output node of the integrated circuit device when the second transmission mode is enabled.

12. The method of claim 10 further comprising:
storing a first plurality of equalizer coefficients within a plurality of equalizers of a transmission circuit to effect baseband signal generation when the first transmission mode is enabled; and
storing a second plurality of equalizer coefficients within the plurality of equalizers of the transmission circuit to effect multi-band signal generation when the second transmission mode is enabled.

13. The method of claim 12 further comprising storing a third plurality of equalizer coefficients within the plurality of equalizers of the transmission circuit when a third transmission mode is enabled, the transmitter being enabled, in the third transmission mode, to convey the first data sequence in a multi-PAM (Pulse Amplitude Modulation) transmission in which each transmitted symbol conveys more than a single bit of the first data sequence.

14. The method of claim 12 wherein transmitting the first data sequence in a baseband signal comprises:
converting the first data sequence from a single serial stream of data values to a plurality of parallel data substreams; and
filtering each of the parallel data substreams in a respective one of the plurality of equalizers after storing the first plurality of equalizer coefficients therein.

15. The method of claim 12 wherein transmitting the first data sequence in a multi-band signal comprises:
converting the first data sequence from a single serial stream of data values to a plurality of parallel data substreams; and
filtering each of the parallel data substreams in a respective one of the plurality of equalizers after storing the second plurality of equalizer coefficients therein.

16. An integrated circuit device comprising:
means for equalizing with a plurality of equalizers including coefficient storage for storing selected tap coefficients;
means for wireline transmitting a first data sequence in a baseband signal when a first transmission mode is enabled based on the selected tap coefficients; and
means for wireline transmitting the first data sequence in a multi-band signal when a second transmission mode is enabled based on the selected tap coefficients.

17. The integrated circuit device of claim 16 wherein the means for wireline transmitting the first data sequence in a baseband signal comprises a baseband transmitter having an output switchably coupled to an output node of the integrated circuit device, and wherein the means for wireline transmitting the first data sequence in a multi-band signal comprises a multi-band transmitter having an output switchably coupled to the output node of the integrated circuit device.

18. The integrated circuit device of claim 16 further comprising means for storing a first plurality of equalizer coefficients within a plurality of equalizers of a transmission circuit to effect baseband signal generation when the first transmission mode is enabled, and for storing a second plurality of equalizer coefficients within the plurality of equalizers of the transmission circuit to effect multi-band signal generation when the second transmission mode is enabled.

19. The integrated circuit device of claim 18 wherein the means for storing the first plurality of equalizer coefficients and for storing the second plurality of equalizer coefficients comprises means for storing a third plurality of equalizer coefficients to effect a multi-PAM (Pulse Amplitude Modulation) transmission in which each transmitted symbol conveys more than a singe bit of the first data sequence.

20. A manufacture comprising one or more non-transitory computer-readable media, the computer-readable media having information embodied therein that describes a physical implementation of an integrated circuit device, the information including descriptions of:
a plurality of equalizer circuits including coefficient storage circuits for storing selected tap coefficients; and
a multi-band transmitter,
a baseband transmitter; and
a multiplexer having inputs coupled to respective outputs of the multi-band transmitter and baseband transmitter, the multiplexer having an output selected based on the selected tap coefficients coupled to an output node of an integrated circuit device, the output node including a pad for coupling to a wired transmission line.

21. The manufacture comprising the one or more non-transitory computer-readable media of claim 20, wherein the information further comprises descriptions of:
 a serial-to-parallel converter to generate a plurality of data substreams from an input data stream;
 a plurality of equalizer circuits each coupled to receive a respective one of the data substreams and having a respective coefficient storage circuit for storage of coefficients to be multiplied with values in the respective one of the data substreams; and
 a summing element to combine the outputs of the plurality of equalizer circuits to generate an output signal to be transmitted via the output node of the integrated circuit device.

* * * * *